Nov. 20, 1934.    H. F. MARANVILLE    1,981,808
TIRE TREAD BURNER
Filed July 22, 1932

INVENTOR
Harvey F. Maranville
BY Evans & McCoy
ATTORNEYS

Patented Nov. 20, 1934

1,981,808

UNITED STATES PATENT OFFICE 1,981,808

TIRE TREAD BURNER

Harvey F. Maranville, Akron, Ohio, assignor to The General Tire & Rubber Company, Akron, Ohio, a corporation of Ohio Application July 22, 1932, Serial No. 624,059

1 Claim. (Cl. 101—9)

This invention relates to tire tread forming machines and has for its object to provide a machine for burning a suitable tread pattern on tire casings whose treads have been worn smooth.

The treads of pneumatic tire casings have a thickness considerably in excess of the depth of the tread pattern and can be used for a considerable time after their treads have been worn smooth. However, the use of smooth tread tires is objectionable since such tires do not offer sufficient resistance to slipping on a smooth road surface, and consequently with such tires the effectiveness of the vehicle brakes is reduced and the danger of skidding is greatly increased. The use of smooth tread tires have been responsible for so many accidents that in some localities the use of smooth tread tires is forbidden by law.

The present invention aims to provide a simple and inexpensive tread forming device by which a suitable tread pattern may be quickly and easily burned into a smooth tire tread by means of a heated matrix shaped to conform to a segment of the tire tread and provided in concave tread engaging face with projecting ribs which correspond to the grooves of the tread pattern which is to be formed on the tire.

With the above and other objects in view, the invention may be said to comprise the tread forming machine as illustrated in the accompanying drawing hereinafter described and more particularly set forth in the appended claims, together with such modifications and variations thereof as will be apparent to one skilled in the art to which the invention appertains.

Reference should be had to the accompanying drawing forming a part of this specification, in which.

Figure 1:
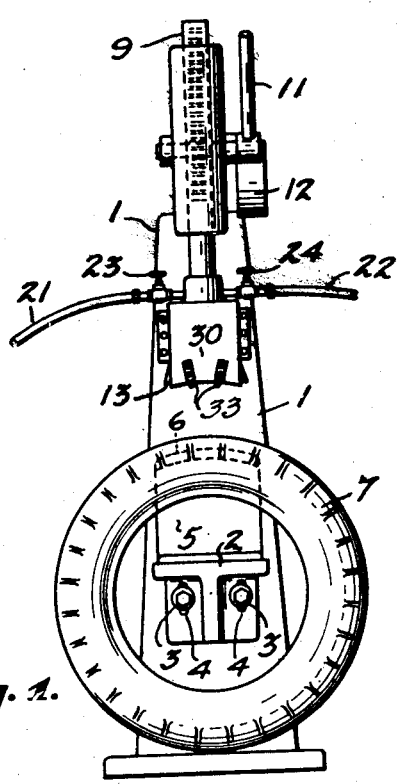
Figure 1 is a front elevation of the machine.
Figure 2:
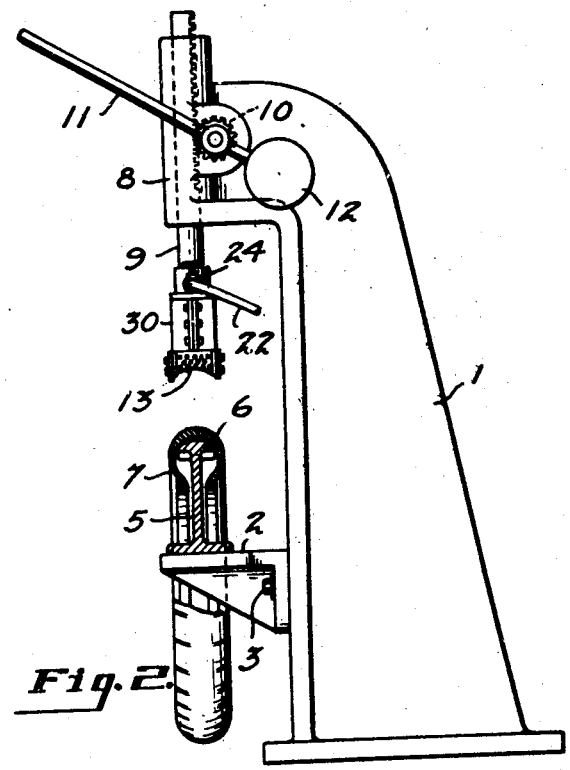
Fig. 2 is a side elevation of the machine.
Figure 3:
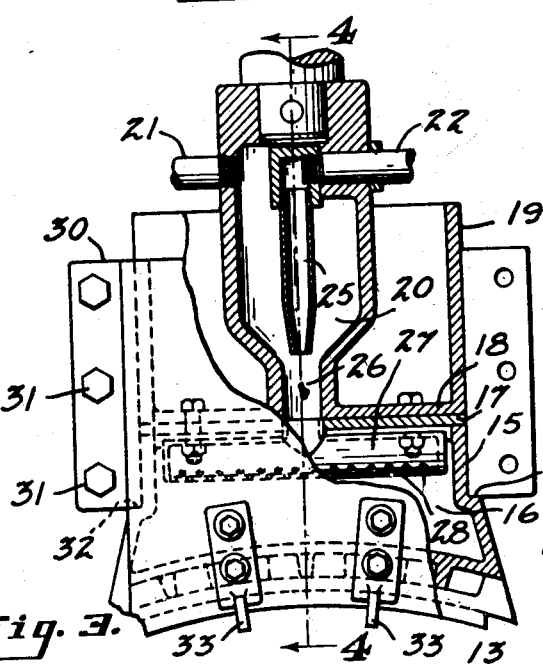
Fig. 3 is a front elevation on an enlarged scale of the tread burning unit, a portion of the unit being broken away and shown in section.
Figures 4, 5:
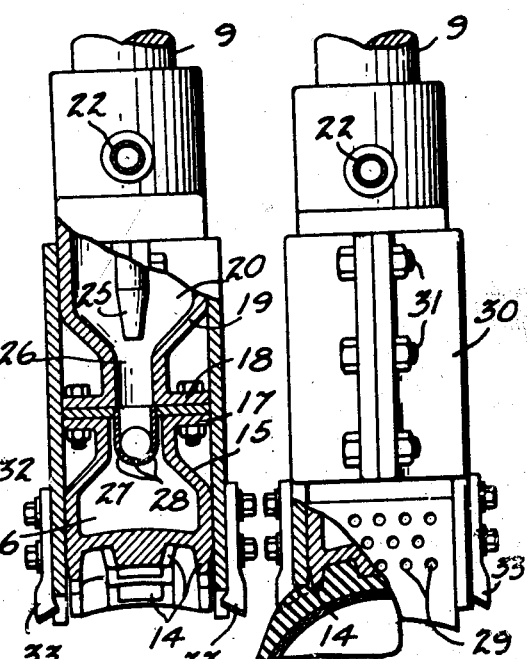
Fig. 4 is a side elevation of the tread burning unit partially broken away to show a portion in section on the line indicated at 4—4 in Fig. 3.
Fig. 5 is a fragmentary side elevation showing the burner unit in engagement with a tire.
Figure 6:
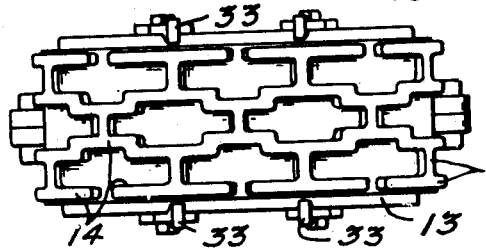
Fig. 6 is a bottom plan view of the tread forming matrix.

Referring to the accompanying drawing, the frame of the machine consists of a standard 1 having a tire support on the front face thereof in the form of bracket 2 secured to the base of the standard by means of bolts 3, the bracket being preferably provided with vertical slots 4 to permit vertical adjustment of the bracket to suit the convenience of the operator. The bracket 2 carries a short standard 5 spaced outwardly from the standard 1 and this standard carries at its upper end an enlargement 6 of longitudinally arcuate form which is transversely convex to conform to the interior of a tire casing placed thereon. The width and height of the bracket 2 and standard 5 are both less than the internal diameter of a tire casing such as the tire casing 7 in Figs. 1 and 2 so that the tire casing may be readily put in place thereon with the arcuate core member 6 upon the interior of the tire casing.

The standard 1 has a forwardly projecting top portion 8 on which is mounted a vertically disposed spindle 9 in the form of a rack which meshes with a pinion 10 journaled in the standard 1. The pinion 10 is actuated to move the spindle 9 up and down by means of a hand lever 11 attached to the shaft of the pinion, the lever being provided with a counterweight 12 which acts to normally hold the spindle in an elevated position.

Supported on the lower end of the spindle 9 there is a matrix 13 which is shaped to conform to the tread portion of a tire casing 7 supported on the core member 6. The matrix 13 is in vertical alinement with the core member 6 and may be moved downwardly into clamping engagement with a tire on the core member 6 by means of a hand lever 11.

Suitable means is provided for heating the matrix 13 so that the ribs 14 thereof will burn their way into a tire tread and form the tread pattern. As herein illustrated the matrix is heated by means of a gas burner and forms the bottom wall of a hollow casting 15 shaped to provide a burner chamber 16. The upper edges of the side walls of the casting 15 are offset inwardly and provided with flanges 17 which are attached to corresponding flanges 18 of a hollow casting 19 which is shaped to provide a mixing chamber 20. The upper end of the casting 19 is rigidly attached to the spindle 9 and air and a combustible gas are supplied to the mixing chamber 20 through pipes 21 and 22 which are controlled by valves 23 and 24. The gas pipe 22 communicates with a vertical nozzle 25 disposed centrally of the mixing chamber 20 in alinement with a central opening 26 leading to the burner chamber 16. The air pipe 21 communicates with the mixing chamber 20 exteriorly of the nozzle 25 and the air and gas mixture is delivered through the opening 26 into a burner nozzle 27 within the burner chamber 16 which extends the full length of the chamber and which is provided on its under side throughout its length with perforations 28 which project flames against the bottom wall of the chamber which forms the matrix, the burner chamber 16 being provided with apertures 29 at one or both ends thereof to permit escape of gases of combustion.

A rectangular jacket 30 formed of two sections connected by bolts 31 fits exteriorly over the castings 15 and 19 and rests upon shoulders 32 at opposite ends of the casting 15. The side walls of the jacket 30 normally project slightly below the matrix 13 and are each provided with a pair of projecting lugs 33. When the spindle 9 is moved downwardly to engage the matrix with the tread of the tire on the core member 6, the lugs 33 first engage the shoulders of the tire to firmly seat the tire upon the core member 6 and center the matrix 13 with respect to the tire tread. Upon continued downward movement the matrix is brought into engagement with the tire tread and the ribs 14 of the matrix gradually burn their way into the tire tread forming grooves therein of the desired depth and configuration.

After each burning operation the spindle 9 is lifted to withdraw the matrix and the tire casing is adjusted circumferentially on the core member 6 to position an adjacent segment thereof beneath the matrix after which the burning operation is repeated, the matrix being pressed into engagement with the tire tread, released to free the tire tread and the tire adjusted on the support as many times as is necessary to form the tread pattern throughout the circumference of the tire casing.

It will be apparent that the present invention provides a machine by which a desired pattern can be quickly and easily formed in a tread which has been worn smooth, or that at small cost worn tires are made suitable for further use.

Furthermore, it is to be understood that the particular form of apparatus shown and described, and the particular procedure set forth, are presented for purposes of explanation and illustration and that various modifications of said apparatus and procedure can be made without departing from my invention as defined in the appended claim.

What I claim is:

A tire tread forming machine comprising a standard, a bracket carried by said standard, means for adjusting said bracket vertically, a tire supporting standard positioned upon said bracket, a core having a longitudinally and transversely convex upper surface and forming the upper part of said tire supporting standard, a tread forming matrix carried by said standard and having a longitudinally and transversely convex surface, means for forcibly pressing said tread forming matrix toward said core, means carried by said tread forming matrix for centering said matrix with respect to said core, and a gas and air mixing chamber formed inwardly of said matrix for the heating thereof.

HARVEY F. MARANVILLE.